Dec. 31, 1957  A. W. MALL ET AL  2,818,147
ENGINE GOVERNOR AND CLUTCH
Filed Jan. 31, 1955  2 Sheets-Sheet 1

Inventors,
Arthur W. Mall,
Charles A. Mattson, &
Walter Ziegler.
By John Bundock Jr. Atty.

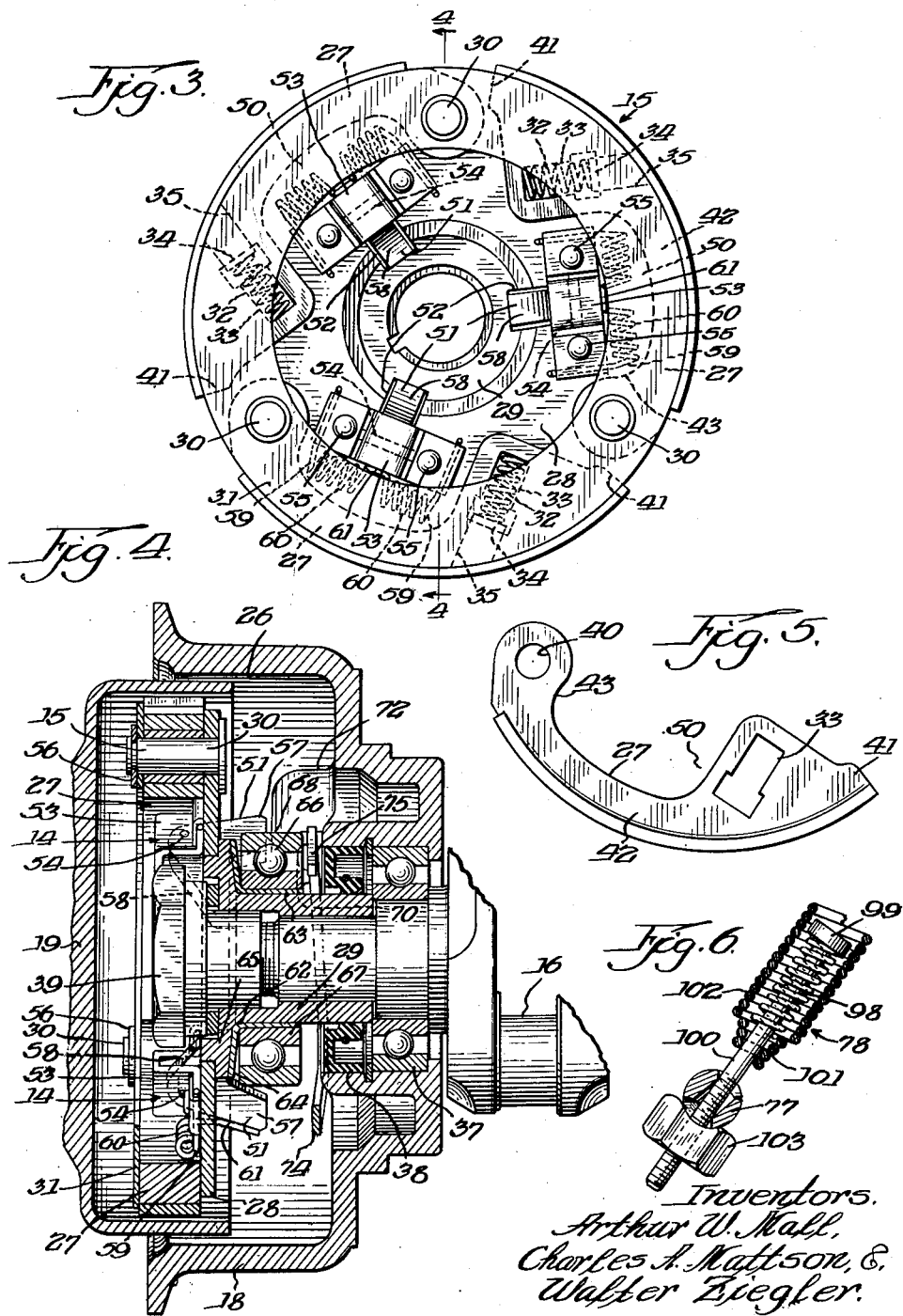

United States Patent Office 2,818,147
Patented Dec. 31, 1957

2,818,147
ENGINE GOVERNOR AND CLUTCH

Arthur W. Mall, Flossmoor, and Charles A. Mattson and Walter Ziegler, Crete, Ill., assignors to Mall Tool Company, Chicago, Ill., a corporation of Illinois Application January 31, 1955, Serial No. 485,243

19 Claims. (Cl. 192—.096)

This invention relates to improvements in control systems for internal combustion engines and more particularly concerns an engine governor mechanism mounted in an assembly including a self-energizing clutch for an engine of unique construction which is especially adapted to power a number of different machine attachments.

It is a principal object to provide a shaft governor which depends for actuation upon a plurality of masses carried in an assembly with a self-energizing clutch which is mounted on the engine crankshaft, where the clutch is utilized for transmitting torque to the driven shaft journalled in the transmission housing of the attachment and where the governor is rotated by the engine and acts directly upon the throttle valve of the engine. An ordinary self-energizing centrifugal clutch consists of a clutch plate on which the shoes are pivotally mounted, with springs to oppose centrifugal force acting on the shoes. In the present invention the clutch plate carries as well flyweights of a speed responsive mechanism, this clutch plate being so constituted as to support both the clutch shoes and the flyweights in a balanced arrangement.

To obtain greater stability and sensitivity it is desirable to eliminate as much as possible the transmission of spring forces through the governor mechanism to produce a minimum of frictional load on the working parts of the governor. Reducing friction results in greater stability and sensitivity.

It is, therefore, an object of this invention to provide a governor mechanism wherein a minimum of frictional load is imposed on the working parts, so as to obtain a high degree of sensitivity and stability of performance. It is more specifically an object of this invention to support flyweights of a speed responsive mechanism in an assembly on a clutch plate, which weights have individual springs to oppose movement in response to centrifugal force. It is also an object to provide an assembly wherein a thrust collar is positioned axially of the base plate by the flyweights, which movement is translated through a linkage to angular movement for adjusting the throttle valve of the carburetor of the engine. It is still a further object to provide a linkage which will translate a small angular movement corresponding to the small distance the thrust collar is moved to a large angular movement necessary to adjust the valve in the carburetor between no load and full load position. It is another object to include provision in the linkage for overriding the action of the governor as required when the throttle control is adjusted manually to decrease the speed of the engine during a load condition when the governor is operating.

According to the present invention the flyweights are mounted on the clutch plate adjacent a thrust collar and when the governor speed is reached, the flyweights move to push the thrust washer along the crankshaft. The forces created by rapid rotation of the flyweights are substantially entirely opposed by the springs carried thereon so that positional adjustment of the thrust collar is accomplished. There is a range of speed required to alter the configuration of the governor to place the thrust washer at the full load-input limit resulting in a droop in the speed-load curve of the governor, however, the range is but a small percentage of the normal operating speed of the engine.

In the linkage which transmits movement of the thrust collar to the throttle valve in the preferred embodiment of this invention, an adjustment device is employed to permit different governor settings. An arrangement is provided to translate axial movement of the thrust collar to rotational movement of a shaft which is mounted to extend from the housing where it is bent at a right angle to form a lever for translating the rotational movement to linear movement at the end of the lever. A spring is fastened at one end to the housing and at the other end to this lever. By adjusting the tension of the spring the force necessary to move the thrust collar is varied and accordingly the force necessary to move the weights. This invention provides a simple arrangement permitting different speed settings for the different attachments used with the engine.

Other objects and advantages of the invention will be apparent from the following description.

In the accompanying drawings:

Fig. 3 is a front elevation of the clutch governor assembly removed from the crankshaft;

Fig. 4 is a sectional view of the assembly of Fig. 3, taken on lines 4—4, in place on the engine crankshaft within the clutch housing;

Fig. 5 is an enlarged detail view showing the clutch shoes;

Fig. 6 is a detail view of the spring employed in the adjustment mechanism.

Figure 1:
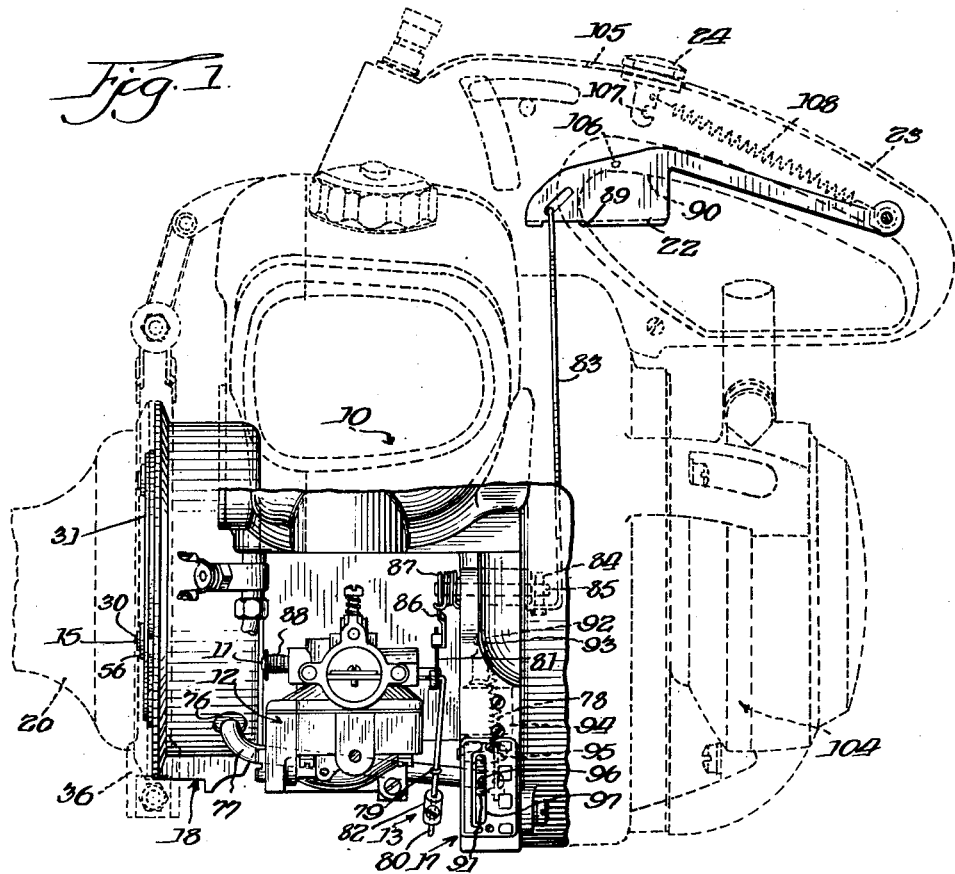
Fig. 1 is a side elevation of an internal combustion engine equipped with the clutch governor assembly with a portion of the carburetor air intake system removed.

With a clutch governor assembly installed on an engine 10 as shown in Fig. 1, a throttle valve (not shown) carried on shaft 11 in the throttle bore of the carburetor 12 is adjusted through a linkage 13 from the speed responsive mechanism 14 (Fig. 4) mounted in combination with a clutch 15 on the crankshaft 16 of the engine. An adjustment mechanism 17 (Fig. 2) arranged to be accessible to the exterior of the housing is provided to permit the operator to adjust the governor in accordance with the speed requirements of a machine attachment clamped to the clutch housing 18 of engine 10. The attachment may be a generator, chain saw, or pump, for example, which is powered by the engine 10 through a transmission including a clutch drum 19 (Fig. 4) contained in the transmission housing 20 mounted on the machine frame. Engine 10 is provided with a throttle control shown as a hand-operated trigger 22, which may be contained within a handle 23 for ease of operation. With any machine attachment, the engine at idle speed is declutched from the transmission of the attachment by means of centrifugal clutch 15 and when the throttle control is squeezed the engine accelerates to engage the clutch and drive the shaft journalled in the transmission housing.

The governor acts to control engine speed when the speed setting for the particular attachment is exceeded and is sufficiently sensitive to hold the engine speed at the set value with good speed regulation. It also may be used to control acceleration above a maximum speed for the engine, to prevent damage to engine parts through excessive wear occasioned by prolonged operation at an excessive speed.

As indicated in Fig. 1 hand throttle trigger 22 may be provided with a throttle lock 24 constructed as disclosed in the co-pending application of Arthur W. Mall, Robert G. Sholeen and Peter Walzak, Serial No. 485,242, filed January 31, 1955, to hold the throttle trigger in wide open position. If there is no necessity for the operator to actuate the throttle manually, with a governor provided on the engine to control engine speed, and the engine coupled to a generator or pump attachment, for example, the unit may be set up and placed in operation and left unattended to run for extended periods of time.

The engine 10 has a crankshaft 16 journalled in the crank case carrying the clutch governor assembly in the flanged opening 26 of the clutch housing 18. Clutch 15 is provided to couple crankshaft 16 to a driven shaft carrying clutch drum 19 and includes centrifugal shoes 27 mounted on a circular plate 28. The shoes are pivotally supported on pins 30 and are held against the plate by ring 31 which forms a guide for the shoes 27 controlling their outward movement. Compression springs 32 in pockets 33 of the shoes fit against flanges 34 punched out at 35 of the clutch plate.

Rotating the assembly mounted on the crankshaft causes shoes 27 to move outward about pivot pins 30 against the action of the springs 32 to engage the inner surface of clutch drum 19 carried on the end of the driven shaft journalled in the transmission housing when such is clamped in place by clamp 36 against the clutch housing.

The clutch governor assembly is supported on the end of crankshaft 16 which extends into the bell-shaped housing 18 through bearing 37 and seal 38. Crankshaft 16 is threaded on the end to receive nut 39 which has a long, internally threaded collar adapted to fit close in the bore of the hub 29 carrying circular plate 28. The hub 29 is provided with a key way as is crankshaft 16 and a key therein is utilized to lock the assembly on the end of the crankshaft. The assembly is thus secured by the nut 39 on the end of the crankshaft and is locked thereto.

In the preferred form of the invention as illustrated in Fig. 5 said clutch shoes 27 are arcuate in shape and have an opening 40 to receive pivot pin 30 in the heel of the shoe. The enlarged toe 41 of the shoe 27 has a substantially rectangular opening or pocket 33 in which compression springs 32 are held against the flanges 34 provided from material struck out of the clutch plate. When ring 31 is in place secured against the outside of the clutch shoes 27 (Fig. 3) it lies at least partially over the opening 33 retaining the springs in position and preventing their popping out of the pockets. Also, the ring 31 serves to control and guide the clutch shoes 27 as they move outward, since it may be observed the wide toe portion 41 of the shoe extends inwardly of the ring and is restrained between the ring and the face of the clutch plate as the shoe swings out toward engaged position. The greater mass of the shoe is in the enlarged toe portion at a substantial distance from the pivot 30. This mass is acted upon when the plate is rotated and the forces generated are of larger magnitude than would be produced with a shoe of the same mass but of uniform thickness throughout the length of the shoe. When the lining of the shoe is brought into initial contact with the inner surface of the drum friction causes an increase in the pressure exerted by the shoe against the drum according to a predetermined jamming angle.

The thin center section 42 is required to lend sufficient strength and rigidity to the shoe so that it will satisfactorily withstand the heavy stresses due to shocks and overloads. Locating the pivot close to the peripheral surface of the clutch plate increases proportionately the compressive stress and reduces the shear stress on the center section. Twisting moments are substantially eliminated due to the control exerted by the ring in cooperation with the face of the clutch plate, and by locating the spring 32 with its axis in the center plane of the body of the shoe.

With stresses of this kind the center of the shoe may be formed of a narrow section resulting in the provision of a substantial protected area 50 partially covered by and under the ring 31 in the crook formed by the center section 42 and the edge 43 of the heel of the shoe. In these areas flyweights 51 are supported in openings 52 disposed radially in the clutch plate, by the brackets 53 and roll pins 54, the brackets being riveted as at 55 through the feet portions to clutch plate 28.

The assembly illustrated as a preferred embodiment of the invention includes three centrifugal shoes spaced around the peripheral surface of the clutch plate in a balanced arrangement. Each of the shoes is pivotally mounted and guided between the opposed surfaces presented by the ring and the face of the clutch plate. This ring should be held firmly against the clutch shoes, a split washer 56 seated in a circumferential groove in the pin 30 being illustrated as a convenient method, although it will be understood any suitable means could be substituted as desired.

The ring 31 and the bodies of the centrifugal shoes 27 form a series of pockets wherein the flyweights are supported, shielded and protected. This is significant since the clutch governer is mounted on the end of the crankshaft and is completely exposed when no attachment covers the clutch housing opening. When switching attachments, if the clutch drum is slid in place over the clutch plate improperly and without due regard for the clutch governor assembly, the face of the plate may receive blows which could result in damage to the flyweight assemblies except for their being shielded. It will be noted that the pockets are spaced evenly around the clutch plate and the flyweight assemblies arranged in these pockets provide with the centrifugal shoes a compact interfitting balanced mechanism.

Flyweights 51 are V-shaped (Fig. 4) comprising an arm 57 initially positioned parallel to the axis of crankshaft 16 and extending through openings 52, and an arm 58 initially positioned radially of the crankshaft. Torsion springs 59 comprising coiled section 60 and loop 61 are strapped in place against the clutch plate 28 by brackets 53 with the end of the loop 61 (Fig. 4) bearing down against the outer edge of flyweights 51 restraining the flyweights against outward movement. When the assembly is rotated flyweights 51 swing outward in response to centrifugal force against the action of the springs causing the toe portion 58 to move in an arc about roll pin 54 and push against a thrust collar 62 which includes a sleeve portion 63 flanged outward at 64 to provide a thrust surface opposite annular boss 65 of clutch plate 28. Bearing 66 comprising inner race 67 and outer race 68 is carried on the sleeve portion 64 of the thrust collar and is preferably press fit on to the sleeve portion. Thrust collar 62 is movable axially of the crankshaft 16 on hub 29 and is positioned by flyweights 51.

Linkage 13 is provided to transmit movement of thrust collar 62 to the throttle valve. Journalled in the clutch housing is a bent shaft 69 (Fig. 2) comprising sections 70, 71 supported in bearing 72, 73 in the housing. Yoke 74 with inward projections or pintles 75 at each end is carried on the bent shaft 69 adjacent thrust collar 62. Upon axial movement of thrust collar 62, through yoke 74, bent shaft 69 is caused to rotate, the angular movement corresponding to the axial movement of thrust collar 62. Section 73 of bent shaft 69 extends through opening 76 (Fig. 1) n the clutch housing and is bent at substantially a right angle to form a lever 77 extending back along the outside of the engine housing underneath the carburetor 12. The end of the lever 77 is fastened to a spring 78 (Fig. 6) which is hooked to an adjusting mechanism 17. It is seen that movement of the shaft section 77 is opposed by spring 78 the tension of which may be adjusted through the adjusting mechanism.

Close to the end of the lever section 77 receiving the spring 78 there is provided a transverse opening 79 through which a connecting link 80 extends to throttle arm 81 of carburetor 11. The end of connecting link 80 below opening 79 is provided with a collar 82 which is fastened to the link. Throttle arm 81 is mounted on shaft 11 which is supported in the throttle bore of the carburetor and carries the throttle valve.

Engine 10 is provided with a hand operated throttle trigger 22 (Fig. 2) which through a link 83 connected to arm 84 on shaft 85 operates a finger 86 to adjust throttle arm 81 between open and closed positions. Coil spring 87 acts to urge finger 86 in a direction to close the throttle valve by urging the finger in a clockwise direction against the throttle arm 81. Shaft 11 is urged in a clockwise direction, as viewed in Fig. 2, by spring 88 toward open position of the throttle valve and thus acts to maintain throttle arm 81 in contact with finger 86 of the hand operated throttle linkage. Spring 87 is stronger than spring 88 resulting in the throttle being closed to idle speed when hand pressure is removed.

The link 80 and lever 77 connection enables throttle trigger 22 to adjust the throttle valve over the complete range of speed of the engine and permits the governor mechanism to control the throttle arm position automatically during periods when the throttle trigger is rendered inoperative by throttle lock 24.

Figure 2:
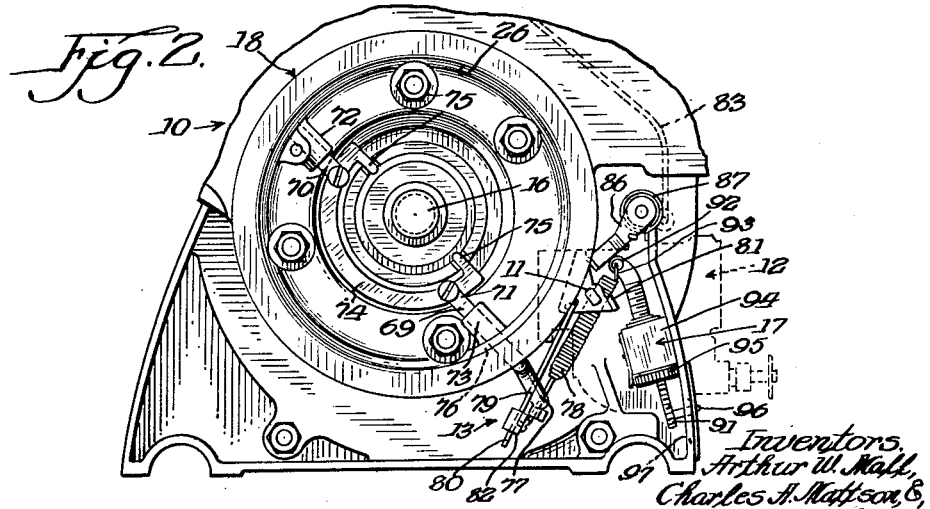
Fig. 2 is a front elevation showing the clutch housing with the clutch governor removed and shows the actuating linkage extending to the carburetor which is shown only diagrammatically to allow the actuating linkage to be viewed unobscured.

The throttle arm is shown in idle position in Fig. 2, an idle speed adjusting screw (not shown) is usually employed to prevent further counterclockwise movement, and to increase engine speed finger 86 is rotated counterclockwise away from the position shown, which permits throttle arm 81 to turn clockwise under the urging of spring 88. Throttle arm 81 is free to move in a clockwise direction and is urged in such direction by spring 88 and the position assumed by the throttle arm is dependent upon the location of finger 86 which may be established by manipulating the trigger. Swinging finger 86 completely away from the throttle arm by squeezing the trigger 22 allows throttle arm 81 to turn and open wide the throttle valve.

It may be observed that throttle arm 81 as it rotates to raise engine speed lifts link 80 which slides through lever 77. In the position shown in Figs. 1 and 2, lever 77 is in a raised position, so placed by thrust collar 62, which as shown in Fig. 4, is positioned against the rear of clutch plate 28. As thrust collar 62 is moved away from clutch plate 28 by the fly weights, the end of lever 77 under the carburetor drops towards the collar on link 80 to engage the link and adjust the position of throttle arm 81.

Trigger 22 may be secured temporarily in open throttle position by a lock 24 in a manner described in detail hereinafter. When so secured the trigger is contained entirely within the handle, and the lower edge 89 of the trigger is positioned even with the underside 90 of the grip portion of handle 23. Link 83 by moving arm 84 counterclockwise causes finger 86 to swing entirely away from throttle arm 81, which is thereby permitted to turn clockwise and open the throttle valve. The movement of throttle arm 81 is transmitted to lift link 80 which slides through lever 77 until collar 82 is raised to abut the lever.

As the engine speed increases under the condition of wide open throttle, lever 77 is caused to drop carrying link 80 down and turning throttle arm 81 back toward closed throttle position. Throttle arm 81 is positioned by the lever 77, with the governor mechanism accounting for variations in load and automatically maintaining the engine speed in accordance with the speed setting of the governor.

To reduce engine speed, lock 24 is disengaged and trigger 22 lowered to idle position. Finger 86 rotates clockwise and turns throttle arm 81 back counterclockwise to the position shown in Fig. 2. Link 80 is caused to plunge down, sliding through the opening in lever 77, and collar 82 is moved away from abutting relationship with the lever. Throttle arm 81, it will be observed, can be operated by the hand trigger to reduce engine speed entirely independently of the governor mechanism. It will be apparent the governor mechanism operates to set a limit on the maximum engine speed, when the engine is controlled by manipulating the hand trigger 22, since lever 77 engages link 80 to turn throttle arm 81 back counterclockwise to close the throttle valve and reduce speed when the engine accelerates above the governor setting.

According to the invention, for adjusting the speed setting of the governor there is provided a mechanism 17 (Fig. 2) shown for illustrative purposes only as comprising screw 91 provided with an opening 92 at its upper end to receive the end 93 of spring 78. The screw is carried in a block 94 which is supported on the engine housing by means such as rivets or the like. A nut 95 knurled on the outer surface is provided to adjust screw 91 vertically relative to block 94 to regulate the tension of spring 78. A pin 96 (Fig. 1) riding in a slot 97 in the housing provides an indicating device and also prevents screw 91 from turning in the block.

Initial downward movement of lever 77 against spring assembly 78 is taken up entirely by cylindrical helical spring 98 (Fig. 6) which is compressed against the enlarged flat head 99 on stud 100 and bears against the lower end of spring 101 which is a truncated spring formed by several coils of gradually reduced diameter. Spring 98 has a smaller coil diameter than has the tension spring 102 and is made of wire having a smaller circular cross section. Stud 100 slides through this neck to compress spring 98 and is adjusted by lever 77 bearing against nut 103 carried on the threaded end of the stud.

The double spring arrangement is used to secure linearity in the relation between the elongation of the assembly and the spring load placed on the governor lever 77 over the full range of small and large deflection, encountered in the operation of the governor imposing conditions where the characteristics of the larger spring alone would be non-uniform.

Engine 10 may be clamped to an attachment such as a chain saw, a pump, or a generator by means of clamp assembly including a clamp 36 arranged around the opening in clutch housing 18. An engine starter mechanism 104 operated by a starter rope is provided to start the engine which operates at idle speed in accordance with the carburetor setting when it first starts running.

Adjustment mechanism 17 accessible to the outside of the housing is provided in this preferred form of the invention to adjust the governor to hold the engine speed at the rated speed of the attachment. The engine of an ordinary chain saw cutting under normal conditions should operate, for example, at between 4000 and 6000 R. P. M. with a transmission of the type generally employed. But the free load speed of the engine might rise to 7500 R. P. M. without a speed control device to hold the speed below a safety limit. Thus for chain saw operation the governor should be set at 6000 R. P. M. A generator might require a regulated engine speed of 3600 or 4800 R. P. M. depending on the gear ratio in the transmission on the generator, while a pump might most efficiently be operated by an engine set to run at 4500 R. P. M.

After the governor speed is set by the operator, as for illustration, at 4800 R. P. M. for a generator clamped to the engine, the throttle is squeezed and locked in wide open position. Throttle lock 24 is pushed forward in slot 105 so that pin 106 in trigger 22 may be engaged by hook 107 when after the trigger is squeezed, the throttle lock is allowed to be pulled back by spring 108. As the engine accelerates, clutch shoes 27 are thrown out toward the clutch drum and engage the inside of the drum to drive the generator. In the arrangement of the clutch shown, the clutch shoes slip at speeds just below operating speed, along the inside surface of the clutch drum and when the engine speed is accelerated sufficiently to reach the operating speed the clutch is engaged but on the verge of slipping.

Above the speed of engagement for the clutch assembly, which may be varied by changing the springs 32, the load is coupled to the engine. If the engine continues to accelerate above the governor speed the flyweights in response to centrifugal force swing out against the action of springs 59 to slide the thrust collar along the crankshaft. The thrust collar is held against the toe of the fly weights by lever 77 acting through yoke 74.

The tension of spring 78 may be adjusted through rotation of nut 95 and location of the pointer 96 with respect to the 4800 mark on the housing, causing the screw 91 to move vertically in the housing, elongating the spring and placing the spring load on lever 77.

When the engine speed accelerates above the speed setting of the governor as determined by the tension of spring 78, the thrust collar will be positioned on hub 29 to balance the load. Through yoke 74 the axial movement of the thrust collar is translated to angular rotation of the broken shaft, causing the end of lever 77 to pull downward against the collar on the end of the connecting link 80 hooked to the throttle arm 81. Thus the throttle arm is rotated in a direction to close the valve in the throttle bore of the carburetor and reduce the engine speed. When the throttle valve is closed sufficiently to prevent further acceleration of the engine a balance is reached between the valve position and the thrust collar position. At a speed above this condition of balance the lever will operate to close the valve and at a speed below, the governor will open the throttle to bring the engine up to speed.

Under the condition of partial load, with the throttle held open, the engine in the absence of governor control tends to accelerate to a speed in excess of safe speed and would continue to run at this high speed unless the throttle trigger was relaxed. The governor of this invention is effective to limit the maximum speed with the trigger held by hand to position the throttle in open position. The governor automatically adjusts the carburetor to cause the engine to operate at the speed setting of the governor when the trigger is held by the throttle lock to position the throttle open.

When the governor speed is reached the thrust collar acting through the yoke tends to rotate the broken shaft clockwise as viewed from the carburetor side of the engine causing the end of the lever to rock down against the collar on the connecting link against the action of spring 78, elongating the adjusting spring. Depending on the load on the engine the speed at which the governor is set may be maintained by half throttle, three quarter throttle or full throttle but assuming a partial load the throttle position corresponding to the load and speed condition will be somewhere between the closed and open position. With the trigger held in open position the throttle arm is rotated clockwise and the connecting link 80 raised from the position depicted in the drawings which would be idling condition. Therefore the connecting link collar will be engaged immediately upon initial movement of the thrust collar, by the end of the lever which is dropping from the initial raised position, and adjusted to a point somewhere between the depicted position and a postion assumed when the throttle arm is swung to its extreme clockwise position.

The fact that the throttle is adjusted to different positions depending on the load explains the droop in the speed-load curve of the governor since if a change in load takes place the governor must act to adjust the throttle to alter the input. This requires that the thrust collar be displaced a certain amount and the weights can retain their new position only at the changed speed of rotation of the assembly.

If the engine continues to accelerate the thrust collar is pushed along the hub and the lever moved downward to pull the connecting link in a direction to close the throttle valve. When the throttle valve is moved sufficiently toward closed position so that acceleration ceases a balanced condition is achieved.

The throttle arm, it will be noted, is not connected to the finger in the hand throttle linkage but is urged against the finger by spring 88. Spring 87 acts to urge the finger toward the throttle arm, with the spring 87 being only slightly stronger than the spring 88 to make it possible to adjust the throttle valve from the trigger 22 by overcoming only the differential between the spring forces. It will be noted, however, that to move the connecting link downward by moving the lever in the governor linkage it is necessary to overcome the entire force of spring 88 when the trigger is positioned to open the throttle (or is held wide open by the throttle lock 24) and the finger 86 is rotated away from engagement with the throttle arm. The force of spring 88 not only must be overcome to position the throttle arm, but this force it will be observed is transmitted through the governor linkage to the thrust collar and opposes axial movement of the thrust collar.

Assuming a condition when the governor is operating to control the engine speed, when the trigger of the hand throttle is released the finger in the throttle linkage will be caused to rotate clockwise and consequently will be swung out of engagement with the throttle arm. The throttle arm will thereby be caused to rotate counterclockwise under the action of its spring toward closed position plunging the connecting link down through the lever and withdrawing the collar on the end of the connecting link from engagement with the lever. This action may be termed an overriding of the governor, since the throttle valve may be adjusted independently of the governor mechanism. When the throttle is closed the governor mechanism will seek its low speed position, the end of the lever rides up the connecting link to the position depicted in Fig. 1. If the engine speed is lowered below clutch engagement speed the clutch shoes will be released from engagement with the clutch drum and the load will be disconnected from the engine.

The thrust collar is pushed from the position against the rear of the clutch plate indicated on Fig. 4, to positions of equilibrium along the hub in accordance with the speed of rotation of the crankshaft. Accordingly, the thrust collar seeks a position whereby the load is balanced with the throttle valve position when the speed of the engine is increased above the speed at which the governor is set.

It is generally deemed desirable to eliminate transmission of spring forces through the governor mechanism since a reduction in friction results in improved stability and sensitivity. The force exerted by spring 87 is of relatively small magnitude, and the introduction into the governor mechanism although somewhat undesirable, therefore does not seriously affect the sensitivity of the system. The convenience of having an easily accessible and dependable adjustment device for the governor speed setting overcomes the disadvantage resulting from the addition of the adjusting spring 78 which introduces spring forces into the mechanism, which forces must be overcome to move the thrust collar.

While the invention has been described with particularity and reference to specific details of construction it is to be understood that modifications and changes within the purview of a man skilled in the art can be effected without departing from the spirit of this invention as defined in the appended claims.

We claim:

1. A governor comprising a plate for rotation by the machine to be governed, said plate being provided with a plurality of openings extending between the front and rear surfaces thereof, flyweights pivotally supported on said plate for pivotal movement in response to centrifugal force and projecting rearwardly through said openings, said flyweights having portions movable rearwardly behind said plate as said flyweights pivot under centrifugal force, spring means resisting rearward movement of said portions of the flyweights, a thrust member carried behind the plate and arranged to engage said portions of said flyweights whereby said thrust member is positioned away from the plate in accordance with the speed of the machine, and means operated by the thrust member for reducing the speed of the machine when the plate and flyweights are rotated in excess of a predetermined speed.

2. A governor for an engine provided with a speed controlling throttle valve comprising, a plate for rotation by the engine, said plate being provided with a plurality of openings extending between the front and rear faces thereof, flyweights pivotally supported on the plate and projecting rearwardly through said openings, a thrust member movably carried behind the plate, said flyweights being adapted to pivot in response to centrifugal force and being engageable with said movable thrust member for urging said member rearwardly away from the plate in accordance with the speed of the engine, and means operated by the thrust member and for reducing the throttle valve opening when the engine overspeeds.

3. A governor for an engine having a crankshaft, an engine housing and a speed regulating throttle comprising, a plate mounted on the crankshaft having openings symmetrically located about the axis of rotation, flyweights pivotally supported on the face of the plate and projecting rearwardly through said openings, said flyweights having portions behind said plate adapted to move rearwardly in response to centrifugal force, springs resisting rearward movement of said portions of the flyweights, a thrust collar movably carried on the crankshaft behind said plate and arranged to engage said rearwardly movable portion of said flyweights whereby said thrust collar is positioned along the crankshaft in accordance with the speed of the engine, a shaft rotatably supported in the engine housing adjacent said thrust collar, an arm extending from said shaft and bearing against said thrust collar so that the shaft is rotatably adjusted by said thrust collar, and means connecting said shaft to the throttle to adjust engine speed.

4. A governor for engines having a crankshaft, an engine housing and a speed regulating throttle comprising, a disc plate, an elongated sleeve fastened on the crankshaft and forming a hub bearing said disc plate, said hub extending in part behind the plate, said plate being provided with radially extending openings located adjacent the hub and symmetrically arranged about the hub axis, flyweights pivotally supported on the plate and having portions rearwardly movable under centrifugal force behind the plate, a thrust collar movably carried on the hub behind the plate and arranged to engage the rearwardly movable portions of said flyweights whereby said thrust collar is positioned along the hub in accordance with the speed of the engine, a shaft rotatably supported in the engine housing adjacent said thrust collar, an arm extending from said shaft and bearing against said thrust collar so that the shaft is rotatably adjusted by said thrust collar, and means connecting said shaft to the throttle to adjust the engine speed.

5. The combination in a clutch and governor actuator assembly of a rotatable clutch plate, a clutch drum surrounding the clutch plate, clutch shoes supported on the face of said clutch plate to move radially under centrifugal force into and out of engagement with the clutch drum, said clutch shoes being provided with a body portion and a portion extending therefrom and forming a protected area therebetween, and a governor actuator including flyweights pivotally mounted adjacent the openings provided in the clutch plate in the protected areas and having portions rearwardly movable under centrifugal force behind the plate, and a movable member carrier behind the clutch plate and arranged to bear against the rearwardly movably portions of said flyweights whereby said member is positioned away from the clutch plate in accordance with the speed of rotation of the clutch plate.

6. The combination in a clutch and governor actuator assembly of a rotatable clutch plate carried on a shaft, a clutch drum surrounding the clutch plate and mounted on a driven shaft, clutch shoes pivotally supported on the face of said clutch plate to move radially under centrifugal force outward to engage the clutch drum, said clutch shoes having a body portion and a portion extending from the body portion and forming a protected area therebetween, and a governor actuator including flyweights pivotally mounted adjacent openings provided in the clutch plate in the protected areas under the shoes and having portions rearwardly movable under centrifugal force behind the clutch plate, and a thrust member carried behind the clutch plate and arranged to bear against the rearwardly movable portions of said flyweights whereby said member is positioned away from the clutch plate in accordance with the speed of rotation of the assembly.

7. The combination in a clutch and governor actuator assembly of a rotatable clutch plate formed with a hub extending behind the plate, clutch shoes pivotally supported on the face of said clutch plate to move radially under centrifugal force, said clutch shoes being provided with a body portion and a portion extending from the body portion and forming a protected area therebetween, and a governor actuator including flyweights pivotally mounted upon the face of said clutch plate in the protected areas and projecting rearwardly through openings provided in said plate, said flyweights being adapted to pivot in response to centrifugal force, springs strapped on the face of said plate and disposed against said flyweights to resist such movement of said flyweights in response to centrifugal force, and a movable thrust collar carried behind the clutch plate on the hub and arranged to bear against the flyweights for movement away from said plate when said flyweights pivot in response to centrifugal force, whereby said collar is positioned along the hub in accordance with the speed of rotation of the assembly.

8. The combination in a clutch and governor assembly of a rotatable clutch plate having a hub extending behind the plate, a clutch drum surrounding the rotatable clutch plate, a series of pins symmetrically arranged about the axis of rotation of the face of the clutch plate, a member carried on the pins, clutch shoes to engage the clutch drum pivotally supported on said pins and retained in alignment between said member and the face of the clutch plate, said clutch shoes being provided with an arcuate body portion carried under the member and a toe portion extending radially inwardly forming a protected area therebetween and below the member, and a governor actuator including governor flyweights pivotally mounted adjacent openings provided in the clutch plate in the protected areas between the toe and body portions of the clutch shoes and projecting rearwardly through said openings, said flyweights being movable in response to centrifugal force, coiled torsion springs strapped to the face of said plate and disposed against said flyweights to resist such movement of said flyweights under centrifugal force, and a thrust member mounted on the hub behind said clutch plate and arranged to bear against the flyweights whereby said member is moved along the hub in accordance with the speed of rotation of the assembly.

9. The combination in a clutch and governor actuator assembly of a rotatable clutch plate having a hub extending behind the plate, a series of pins symmetrically arranged about the axis of rotation on the face of the clutch plate, a ring carried on the pins, centrifugally actuated clutch shoes pivotally supported on said pins to move outward and retained in alignment between said ring and the face of the clutch plate, said clutch shoes being provided with an arcuate body portion carried under the ring and a toe portion extending radially inwardly forming a protected area therebetween and below the ring, brackets carried on the face of the clutch plate over radially extending elongated openings provided in the clutch plate in the protected areas between the toe and body portions of the clutch shoes and below the ring, and a governor actuator including V-shaped flyweights pivotally mounted at their apex in said brackets, said flyweights each having one arm located adjacent one of the openings and adapted to pivot rearwardly behind the plate under centrifugal force, coiled torsion springs strapped to the face of said clutch plate and disposed against the flyweights to resist such pivotal movement, and a thrust collar mounted on the hub behind said clutch plate arranged to bear against the arms of the flyweights, whereby said thrust collar is positioned along the hub in accordance with the speed of rotation of the assembly.

10. In an internal combustion engine, having a throttle valve, resilient means biasing the throttle valve open, and a member limiting such movement, a trigger connected to the member operable to move the member away from the throttle valve whereby the valve is free to move to wide open position, means for holding the trigger with said member positioned away from the valve, and a governor to control the throttle valve including means responsive to engine speed extending to the valve and connected to reduce the throttle valve opening when the engine over-speeds.

11. In an internal combustion engine having a throttle, resilient means biasing the throttle open, and a member to adjust the throttle, a trigger connected to the member, a lock to hold the trigger with said member away from the throttle whereby the throttle is free to move to wide open position, and a governor including an engine speed responsive actuator for adjusting said throttle and for automatically regulating engine speed when said trigger is locked.

12. In an internal combustion engine having a throttle, an arm connected to the throttle, a spring biasing the throttle open, and an adjustable member engaging the arm to limit movement of the throttle, a trigger for adjusting the member, a lock to hold the trigger with the member away from the arm, whereby the throttle is free to move to wide open position, and a governor for adjusting said throttle and for regulating engine speed including a speed responsive actuator, a lever connected thereto, a linkage interconnecting the lever and the throttle, a spring fastened to the lever and opposing movement of the actuator, and means for adjusting the tension of said spring to vary the speed setting of the governor.

13. In an internal combustion engine, a throttle, a throttle arm, means biasing the throttle open, a member to adjust the arm and movable away from the arm, a trigger connected to the member, a lock to hold the trigger with the member positioned away from the arm whereby the throttle is free to move to wide open position, and a governor including a speed responsive mechanism, a governor lever adjusted in accordance with engine speed by said mechanism, and a link interconnecting said lever and the throttle arm, said lever and the link having an over-ride coupling to permit the trigger to over-ride the governor when the trigger is released.

14. In an internal combustion engine having a crankshaft, an engine housing, and a speed regulating throttle, a throttle arm, a spring biasing the throttle open, a member pivotally supported on the engine housing arranged to adjust the position of the throttle arm and movable away from the arm, a trigger mounted on the housing and connected to the member, a trigger lock to hold the trigger with said member positioned away from the arm whereby the arm is free to move and the throttle is moved by the spring to wide-open position, and a governor to regulate engine speed under throttle lock condition including a speed responsive mechanism carried on the crankshaft, a governor lever adjustably supported in the engine housing and operated by said speed responsive mechanism, and a link interconnecting said lever and the throttle arm, said link and the lever having an over-ride coupling to permit the trigger to over-ride the governor when the trigger lock is released.

15. In an internal combustion engine, a throttle valve, a throttle arm carried by said valve and movable between an open and a closed position for opening and closing said valve, resilient means biasing the throttle arm into open position, a movable member normally engaging said throttle arm for limiting movement of the throttle arm towards open position, a trigger connected to the member and operable to disengage said member from the throttle arm whereby the throttle arm is free to move to wide open position, and a governer including engine speed responsive means, and a linkage extending from said means to the throttle arm for adjusting the throttle valve and thereby regulating engine speed when said member is disengaged from said throttle arm.

16. In an internal combustion engine having a crankshaft, an engine housing, and a speed regulating throttle valve, a throttle arm carried by said valve and movable between an open and a closed position for opening and closing said valve, means biasing the throttle arm into open position, a lever being engageable with said arm to adjust the position of the throttle arm and being disengageable from the arm whereby the throttle is free to move to wide open position, a finger trigger mounted on the housing and connected to said lever for operating the same, and a governor connected to said throttle arm for regulating said valve when said lever is disengaged from the arm including a speed responsive mechanism carried on the crankshaft, a governor lever adjustably supported on the engine housing and operated by said mechanism, and a link interconnecting said governor lever and the throttle arm.

17. In a governed internal combustion engine, a throttle shaft bearing an arm, a governor lever having a straight section lying substantially parallel to the axis of the throttle shaft and a portion at right angles thereto rotatably supported in the engine housing about which the straight section pivots, and a link connected at one end to the throttle arm and having an over-ride coupling to the lever, said link passing through an opening in the straight section and having a flange on the other end to permit limited positive movement of the link by the lever in only a direction away from the throttle arm, and means engageable with the right angle portion of said lever for pivoting said lever in accordance with the engine speed, thereby moving said link and actuating the throttle arm to adjust the speed of the engine.

18. In a governed internal combustion engine a throttle carried on a throttle shaft bearing an arm, means biasing the throttle open, a member arranged to adjust the position of the throttle arm and movable away from the arm whereby the throttle is free to move to wide open position, a trigger connected to the member, a lock for holding said trigger with the member away from the arm, a governor lever having a straight section lying substantially parallel to the axis of the throttle shaft and a portion at right angles thereto rotatably supported in the engine housing, about which the straight section pivots toward and away from the throttle arm, and a link interconnecting the throttle arm and governor lever, having one end connected to the arm and an over-ride coupling to the lever, said link passing through an opening in the straight section and having a flange on the other end to permit limited positive movement of the link by the lever in only a direction away from the throttle arm, and means cooperating with the right angle portion of said lever for pivoting the lever in accordance with the engine speed, whereby at a predetermined engine speed said lever is pivoted to move the link and adjust the position of the arm to automatically control the speed of the engine, said link dropping through the opening in the lever when the trigger lock is released whereby the trigger and member adjust the position of the throttle arm.

19. In an internal combustion engine a throttle valve, a throttle arm, means cooperating with said arm for biasing the throttle valve open, a governor lever pivotally supported adjacent the throttle arm, means operative to pivot the governor lever away from the throttle arm as the engine speed increases, a spring connected at one end to the lever opposing pivotal movement away from the throttle arm, a member fastened to the other end of the spring, said member being adjustable to change the force opposing pivotal movement whereby the operating characteristics of the governor are varied, and a link interconnecting the throttle arm and the lever to move the throttle arm and reduce the throttle valve opening when the engine over-speeds.

References Cited in the file of this patent
UNITED STATES PATENTS 1,880,456     Moorhouse _____ Oct. 4, 1932